(12) United States Patent
Gibbons

(10) Patent No.: US 8,292,511 B2
(45) Date of Patent: Oct. 23, 2012

(54) ROLLING-ELEMENT BEARING

(75) Inventor: John L. Gibbons, Gloucester (GB)

(73) Assignee: Rolls-Royce PLC, London (GB)

( * ) Notice: Subject to any disclaimer, the term of this patent is extended or adjusted under 35 U.S.C. 154(b) by 648 days.

(21) Appl. No.: 12/461,423

(22) Filed: Aug. 11, 2009

(65) Prior Publication Data

US 2010/0129020 A1 May 27, 2010

(30) Foreign Application Priority Data

Nov. 24, 2008 (GB) .................................. 0821324.1

(51) Int. Cl.
*F16C 19/00* (2006.01)
*F16C 33/60* (2006.01)
*F16C 33/66* (2006.01)

(52) U.S. Cl. ......... 384/462; 384/470; 384/475; 384/506

(58) Field of Classification Search .................. 384/462, 384/465, 470, 474, 475, 499, 510, 515; 184/6.11
See application file for complete search history.

(56) References Cited

U.S. PATENT DOCUMENTS

| 4,345,799 | A | * | 8/1982 | Crofts | 384/470 |
| 4,874,260 | A | * | 10/1989 | Podhajecki | 384/470 |
| 5,183,342 | A | * | 2/1993 | Daiber et al. | 384/475 |
| 5,312,191 | A | * | 5/1994 | Gallant | 384/468 |

FOREIGN PATENT DOCUMENTS

GB 2 073 828 A 10/1981
* cited by examiner

*Primary Examiner* — Phillip A Johnson
(74) *Attorney, Agent, or Firm* — Oliff & Berridge, PLC

(57) ABSTRACT

A rolling-element bearing 1 comprising an inner race 3, an outer race 2 and an array of rolling elements 4 arranged within a bearing cage 5 situated between the two races 2, 3, the inner surface of the bearing cage 5 being piloted on the inner race 3 for limiting eccentric movement of the cage 5 within the bearing 1 and further having a reservoir 9 formed between a pair of circumferential weirs 6a, 7b on the cage 5, the outer surface of the inner race 3 comprising a raised land portion 3d for contacting oil 9a in the reservoir 9 thereby to control the relative speed of the cage 5 and the inner race 3, wherein the radial depth of each weir 6b, 7b is greater than the maximum radial clearance between the land portion 3d and the cage 5 for maintaining said controlling contact between the land portion 3d and the oil 9a during said eccentric movement of the cage 5.

12 Claims, 1 Drawing Sheet

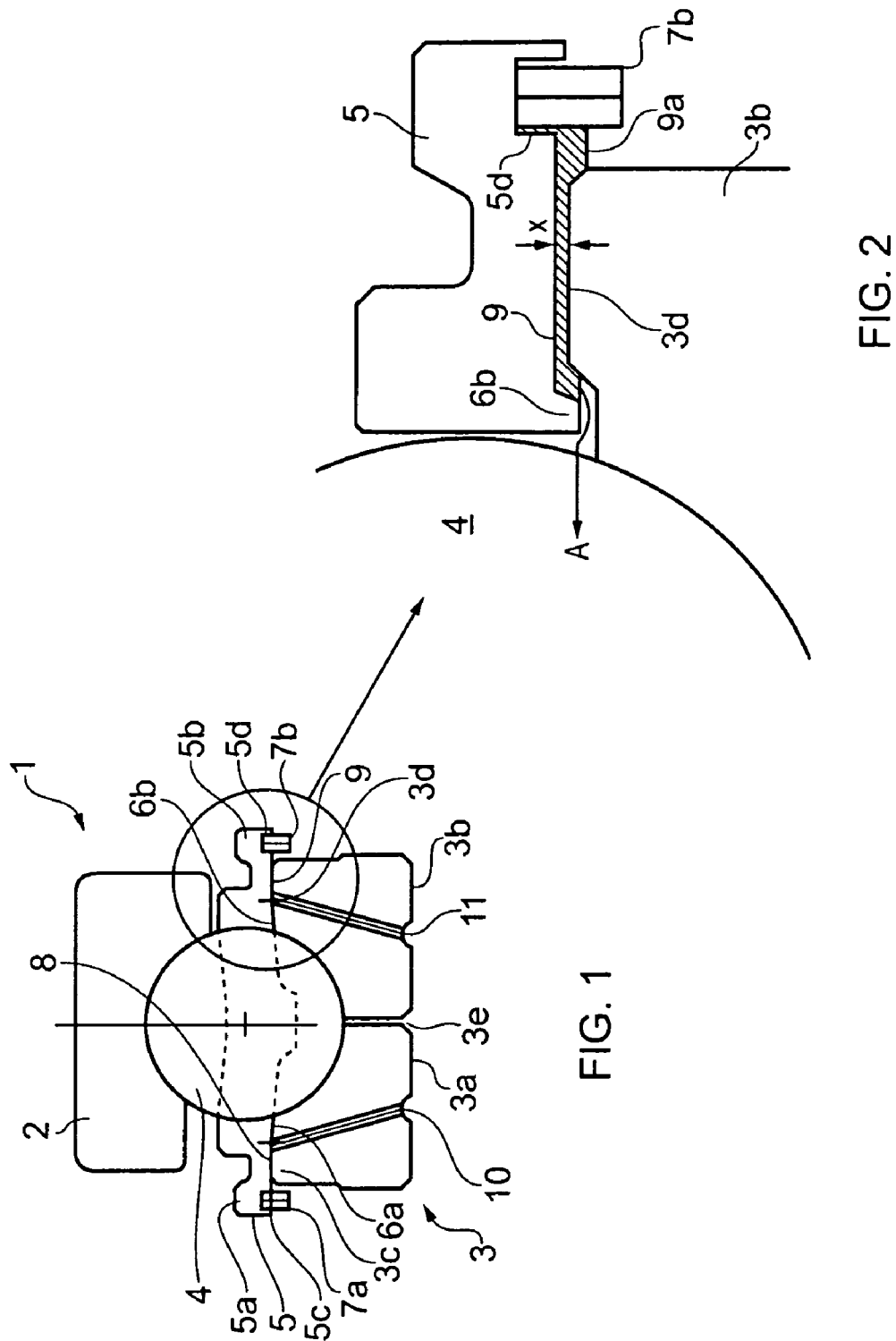

ROLLING-ELEMENT BEARING

The present invention relates to rolling-element bearings, in particular for use in high speed applications such as, for example, in gas turbine engines.

A rolling-element bearing may typically comprise an inner race, an outer race and an array of rolling elements arranged within a bearing cage between the races for rotation at epicyclic speed.

During rotation of the bearing, those rolling elements under load push against the cage and rotate the cage, and the cage in turn pushes those rollers which are not under a load. Unfortunately, the cage does not tend to remain concentric in the bearing but instead tends to move in an eccentric path due to dynamic imbalance; to address this problem, the cage is usually piloted to limit eccentric movement of the cage within the bearing.

The cage may be piloted either on the outer race, the inner race or on the rolling elements themselves.

Under certain operating conditions, rolling-element bearings may suffer from the drawback that the rolling elements skid on the races due to insufficient traction between the rolling element and the raceway to ensure that they run at epicyclic speed. Skidding can lead to high wear rates, overheating and, ultimately, premature bearing failure.

During rotation of the bearing, "centrifugal force" maintains the rolling elements in firm contact with the outer race so that the rolling elements tend to run at the outer race speed (which may be zero for a static outer race) with any skid then being more likely to occur between the rolling elements and the inner race. In such cases it is preferable to pilot the cage on the inner race ie to provide a closer clearance between the inner race and the cage than between the outer race and the cage, so that the lubricating oil in between the cage and the inner race introduces a net viscous drag between the inner race and the cage, tending to cause the cage (and hence the rolling elements) to run closer to the inner race speed.

Unfortunately, in practice centrifugal effects make it difficult to retain lubricating oil in-between the cage and the inner race, and this has a limiting effect on the 'viscous coupling' between the cage and the inner race.

It is an object of the present invention to seek to provide an improved rolling-element bearing.

According to the present invention, there is provided a rolling-element bearing comprising an inner race, an outer race and an array of rolling elements arranged within a bearing cage situated between the two races, the inner surface of the bearing cage being piloted on the inner race for limiting eccentric movement of the cage within the bearing and further having a reservoir formed between a pair of circumferential weirs on the cage, the outer surface of the inner race comprising a raised land portion for contacting oil in the reservoir thereby to control the relative speed of the cage and the inner race, wherein the radial depth of each weir is greater than the maximum radial clearance between the land portion and the cage for maintaining said controlling contact between the land portion and the oil during said eccentric movement of the cage.

The bearing may comprise a reservoir on each side of the array of rolling elements, each reservoir being formed between a respective inner and outer circumferential weir on the cage.

One or both of the inner weirs may have a radial depth which is smaller than the respective outer weir.

One or more of the weirs may be detachable for permitting axial disassembly of the cage from the inner race.

In one embodiment, the inner race is a split race formed from a pair of inner race rings, and the outer weirs are each detachable for permitting axial disassembly of the inner race from the cage.

The outer weirs may each be positioned axially outboard of an end face on the respective inner race ring thereby to limit relative axial separation of the inner race rings for retaining the bearing as a single unit assembly. In particular, one or both of the outer weirs may frictionally engage the respective end face for damping said eccentric movement of the cage.

Each inner weir may be formed as part of the cage, for example by machining. The cage may be a one-piece cage.

One or more of the detachable weirs may be in the form of a resilient ring element which engages the inner surface of the cage in a compression-fit.

The bearing may include one or more oil delivery passages through the inner race for delivery of oil direct to said reservoir or reservoirs.

The bearing may be particularly suitable for use in supporting a main rotor shaft in a gas turbine engine.

According to another aspect of the present invention, there is provided a method of assembling the rolling-element bearing of the present invention, comprising axially assembling the inner race and cage and subsequently securing one or more of said circumferential weirs to the cage. The method may particularly comprise detachably securing said one or more circumferential weirs to the cage for subsequent, axial disassembly of the cage and inner race.

Embodiments of the invention will now be described, by way of example, with reference to the accompanying drawings, in which:

FIG. 1 is a cross sectional view of part of a rolling-element bearing; and

FIG. 2 is an enlarged cross sectional view of part of the rolling-element bearing of FIG. 1.

FIG. 1 of the drawings shows a cross sectional view of part of a rolling-element bearing 1 comprising an outer race 2, an inner race 3 and an array of ball-bearing rolling elements 4 (only one of which is visible FIG. 1) held within a respective bearing cage 5 which is piloted on the inner race 3 with a relatively close running clearance.

The inner race 3 is a split race comprising a first race ring 3a and a second race ring 3b separated along a split-line 3e.

Inner circumferential weirs 6a, 6b (see also FIG. 2) are machined into the inner surface of the cage 5, either side of the ball-bearing 4. Corresponding detachable outer weirs 7a, 7b are provided on end sections 5a, 5b of the cage 5 that extend axially beyond the axial end-faces of the inner race 3. The outer weirs 7a, 7b each comprise a resilient ring element which is retained via a "compression-fit" in corresponding grooves 5c, 5d in the end sections 5a, 5b of the cage 5.

Any suitable resilient ring element may be used for the outer weirs 7a, 7b e.g. circlips, piston-rings, snap rings or the like.

The weirs 6a, 7a and 6b, 7b form respective reservoirs 8 and 9 for receiving lubricating oil delivered through drilled passageways 10 and 11 in the inner race 3. As oil is delivered to the reservoirs 8 and 9 during rotation of the bearing 1, a 'head' of oil (labelled 9a in FIG. 2) will collect in the reservoirs 8, 9 and will be retained in the reservoirs 8, 9 under the centrifugal effect.

Any suitable alternative for delivering the oil to the reservoirs 8, 9 may be used, including providing the oil up the face of the bearing rather than under raceway.

The inner race 3 comprises respective land portions 3c and 3d which extend radially into the reservoirs 8, 9.

The land portions 3c, 3d thus come into contact with the oil collected in the reservoirs 8, 9 during rotation of the bearing 1, which has the effect of imposing a viscous drag on the cage 5 tending to cause the cage 5 (and hence the rolling elements 4) to run at the speed of the inner race 3.

In the embodiment shown in FIG. 1, the land portions 3c and 3d also present a piloting surface for the cage 5, although the cage 5 could alternatively be piloted on some other surface of the inner race 3.

During rotation of the bearing 1, the cage 5 may move in an eccentric path relative to the inner race 3, with the limit of eccentricity being determined by the piloting clearance x between the cage 5 and the land portions 3c, 3d. It will be appreciated that at the limit of eccentricity the cage 5 will come into contact with one or both of the land portions 3c, 3d. Diametrically opposite the contact region between the land portion 3c, 3d and the cage 5 will be a corresponding region of maximum radial clearance between the land portions 3c, 3d and the cage 5. In the case of FIG. 1, this maximum radial clearance will be very close to 2x, being the diametral clearance between the land portions 3c, 3d and the cage 5.

In order to ensure that the land portions 3c, 3d remain "fully wetted" during rotation of the bearing 1, the radial depth of the weirs 6a, 6b, 7a, 7b is greater than the maximum radial clearance 2x between the respective land portion 3c, 3d (best appreciated in FIG. 2). Thus, even at the point of maximum radial clearance between the cage 5 and the land portions 3c, 3d, the land portions 3c, 3d will nevertheless maintain contact along their entire circumferential length with the oil filling the respective reservoir 8, 9, thus tending to maximise the viscous drag between the cage 5 and the inner race 3 for all operating positions of the inner race 3 and cage 5. In addition, the oil in the reservoirs 8, 9 will in effect form a fully flooded hydrodynamic fluid bearing around the entire circumference of the lane portions 3c, 3d for all operating positions of the inner race 3 and cage 5, thus damping eccentric movement of the cage relative to the inner race 3.

The inner weirs 6a, 6b have a smaller radial depth than the respective outer weirs 7a, 7b to encourage inward flow of oil into the bearing, as illustrated in FIG. 2. As oil continues to be supplied to the reservoir 8 (or 9) the oil will thus spill over the smaller inner weir 6a (or 6b), promoting a lubricating inward flow A of oil to the ball bearings 4, cages 5, races 2, 3 etc.

The outer weirs 7a, 7b in FIG. 1 may frictionally engage the axial end faces of the inner race 3 in order to provide a degree of additional frictional damping of the cage. Similarly, the outer weirs might engage an end face of the inner race 3 other than the axial end face, for example an end face of a land portion positioned axially inwardly from the axial end face of the inner race.

The detachable outer weirs 7a, 7b and split inner race 3 permit convenient axial disassembly of the bearing 1 by detaching the outer weirs 7a, 7b and subsequently sliding the inner race rings 3a, 3b axially outwardly away from the inner weirs 6a, 6b on the cage 5 to disassemble the inner race 3 and cage 5. Once the inner race has been disassembled from the cage 5 in this manner, the ball bearings 4 can then conveniently be removed from the cage 5 and replaced as desired.

In order to re-assemble (or initially assemble) the bearing 1, the inner rings 3a, 3b are inserted axially through the axial ends of the cage 5, following location of the ball-bearings 4 in the cage 5 and outer race 2, and the ring elements forming the outer weirs 7a, 7b can then be compression-fitted in the grooves 5a, 5b in the cage 5. By careful selection of the axial separation between the outer weirs 7a, 7b and the respective axial end-faces (or some other end face) of the inner race 3, axial separation of the inner rings 3a, 3b can be controlled to prevent accidental disassembly of the bearing 1. The outer weirs 7a, 7b thus help to retain the bearing 1 as a single unit assembly for convenient transit and fitting until such time as axial disassembly is desired.

The provision of detachable outer weirs allows convenient axial disassembly and assembly of a split inner race. However, in general, it will readily be appreciated that more or fewer detachable weirs may be required for permitting axial disassembly of the cage from the inner race, depending upon factors such as whether the inner race is or are split or one-piece.

The bearing of the present invention need not permit axial disassembly, even in the case where the bearing is axially assembled initially. For example, the bearing may conveniently be axially assembled by axially assembling the inner race and cage, following location of the rolling elements in the cage and outer race, and then subsequently fixedly securing the one or more circumferential weirs to the cage as appropriate.

The bearing of the present invention could make use of alternative rolling elements e.g. rollers or needle rollers.

It is envisaged that the bearing of the present invention may be particularly suitable for high-speed applications such as supporting a main shaft in a gas turbine. However, the invention is not limited to such applications specifically.

The invention claimed is:

1. A rolling-element bearing comprising:
an inner race;
an outer race; and
an array of rolling elements arranged within a bearing cage situated between inner race and the outer race, an inner surface of the bearing cage being piloted on the inner race for limiting eccentric movement of the bearing cage within the bearing, and further having a reservoir formed between a pair of circumferential weirs on the bearing cage, an outer surface of the inner race comprising a raised land portion for contacting oil in the reservoir thereby to control a relative speed of the bearing cage and the inner race, wherein
a radial depth of each of the weirs is greater than a maximum radial clearance between the land portion and the bearing cage for maintaining a controlling contact between the land portion and the oil during the eccentric movement of the bearing cage,
one or more of the weirs are detachable for permitting axial disassembly of the bearing cage from the inner race, and
one or more of the detachable weirs are in a form of a resilient ring element that engages the inner surface of the bearing cage in a compression fit.

2. The rolling-element bearing of claim 1, further comprising a reservoir on each side of the array of rolling elements, each reservoir being formed between a respective inner and outer circumferential weir on the bearing cage.

3. The rolling-element bearing of claim 2, wherein one or both of the respective inner circumferential weirs for each reservoir have a radial depth that is smaller than a radial depth of the respective outer circumferential weir.

4. The rolling-element bearing of claim 2, wherein the inner race is a split race formed from a pair of inner race rings, and the outer circumferential weirs are each detachable for permitting axial disassembly of the inner race from the bearing cage.

5. The rolling-element bearing of claim 4, wherein the outer circumferential weirs are each positioned axially outboard of an end face on the respective inner race ring thereby to limit relative axial separation of the inner race rings for retaining the bearing as a single unit assembly.

6. The rolling-element bearing of claim 5, wherein one or both of the outer circumferential weirs frictionally engage the respective end face for damping the eccentric movement of the bearing cage.

7. The rolling-element bearing of claim 1, wherein an inner circumferential weir is formed as part of the bearing cage.

8. The rolling-element bearing of claim 1, wherein the bearing cage is a one-piece cage.

9. The rolling-element bearing of claim 1, further comprising one or more oil delivery passages through the inner race for delivery of the oil directly to the reservoir.

10. The rolling-element bearing of claim 1, configured to support a main rotor shaft in a gas turbine engine.

11. A method of assembling the rolling-element bearing of claim 1, comprising:
axially assembling the inner race and bearing cage; and
subsequently securing one or more of the circumferential weirs to the bearing cage.

12. The method of claim 11, further comprising detachably securing the one or more circumferential weirs to the bearing cage for subsequent, axial disassembly of the bearing cage and the inner race.

* * * * *